(12) United States Patent
Wu et al.

(10) Patent No.: US 8,311,283 B2
(45) Date of Patent: Nov. 13, 2012

(54) METHOD FOR DETECTING LANE DEPARTURE AND APPARATUS THEREOF

(75) Inventors: Jui-Hung Wu, Changhua County (TW); Jing-Fu Liu, Changhua County (TW); Yi-Feng Su, Changhua County (TW)

(73) Assignee: Automotive Research&Testing Center, Changhua Hsien (TW)

( * ) Notice: Subject to any disclaimer, the term of this patent is extended or adjusted under 35 U.S.C. 154(b) by 1164 days.

(21) Appl. No.: 12/168,150

(22) Filed: Jul. 6, 2008

(65) Prior Publication Data

US 2010/0002911 A1 Jan. 7, 2010

(51) Int. Cl.
*G06K 9/00* (2006.01)

(52) U.S. Cl. ........ 382/104; 382/106; 382/107; 382/181; 382/190; 382/199; 348/148

(58) Field of Classification Search .................. 382/104, 382/106, 107, 181, 190, 199; 348/148
See application file for complete search history.

(56) References Cited

U.S. PATENT DOCUMENTS

| | | | | |
|---|---|---|---|---|
| 5,922,036 A * | 7/1999 | Yasui et al. | ...................... | 701/28 |
| 6,927,694 B1 * | 8/2005 | Smith et al. | ................... | 340/576 |
| 7,218,207 B2 * | 5/2007 | Iwano | ........................... | 340/435 |
| 7,295,683 B2 * | 11/2007 | Yamamoto et al. | ........... | 382/104 |
| 7,933,433 B2 * | 4/2011 | Ogawa | ......................... | 382/104 |
| 2002/0080235 A1 * | 6/2002 | Jeon | ............................. | 348/116 |
| 2004/0201672 A1 * | 10/2004 | Varadarajan et al. | ........ | 348/148 |
| 2006/0233424 A1 * | 10/2006 | Miyajima et al. | ............ | 382/104 |
| 2006/0239509 A1 * | 10/2006 | Saito | .............................. | 382/104 |
| 2008/0007619 A1 * | 1/2008 | Shima et al. | .................. | 348/118 |
| 2008/0109118 A1 * | 5/2008 | Schwartz et al. | ................. | 701/1 |
| 2008/0317288 A1 * | 12/2008 | Aoki et al. | ..................... | 382/104 |
| 2009/0080704 A1 * | 3/2009 | Mori et al. | ..................... | 382/104 |
| 2009/0118994 A1 * | 5/2009 | Mori et al. | ..................... | 701/117 |
| 2010/0054538 A1 * | 3/2010 | Boon | ............................ | 382/104 |

FOREIGN PATENT DOCUMENTS

WO WO 2007000912 A1 * 1/2007

OTHER PUBLICATIONS

Matthews, John H. "Module for Curvature: The Circle of Curvature: It's a Limit!." Department of Mathematics, California State University Fullerton. California State University Fullerton, Oct. 7, 2004. Web. Jul. 11, 2011. <http://math.fullerton.edu/mathews/n2003/curvaturemod.html>.*
Hsu, et al. "Vision-based motion measurement by directly extracting image features for vehicular steering control." Proc Instn Mech Engrs. 211.D (1997): 277-289. Print.*
McKnight, et al. "The Effect of Lane Line Width and Contrast Upon Lanekeeping." Accid. Anal. and Prev.. 30.5 (1998): 617-624. Print.*

* cited by examiner

*Primary Examiner* — Michael A Newman

(57) ABSTRACT

A method for detecting the lane departure of a vehicle includes an image recognition process and a deviation estimation process. The image recognition process includes the following steps: an image capturing step for capturing image frame data by using an image capturing unit; and a lane line recognition for analyzing the image frame data for determining the lane lines. By using a quadratic curve fitting equation, a plurality of lane line being detected so as to establish a road geometry estimation model. The road geometry estimation model is inputted into the deviation estimation process to detect the lane departure of the vehicle so as to alert the driver. Furthermore, an apparatus for detecting the deviation of the vehicle, comprising: an image capturing unit, a processing unit and a signal output unit.

10 Claims, 11 Drawing Sheets

METHOD FOR DETECTING LANE DEPARTURE AND APPARATUS THEREOF

BACKGROUND OF THE INVENTION

1. Field of the Invention

The present invention relates to a method for detecting lane departure and an apparatus thereof, in that the images are used for the recognition of lane lines, and a quadratic curve fitting equation is used to derive a displacement of lane departure of a vehicle and a lane curvature so as to determine whether the vehicle travels along the normal path and thus a warning is issued.

2. Description of Related Art

Nowadays, with the popularity of vehicles, the geographic distance of the world is substantially shortened. However, such transportation improvement apparently accompanies the increment of traffic accidents. Therefore, more and more automotive companies worldwide have been endeavoring to develop advanced safety technologies, which can assist the driver in safer operation of the vehicle and then reduce the possibility of traffic accident occurrence.

Most of traffic accidents are induced from human driving errors, such as fatigue or inattention. Although there are some recent researches being carried out to directly detect the driver's drowsiness via eye blinking or brain waves, the related apparatuses in reality are not easy to be popularized due to the recognition accuracy and the cost. In the prior arts, the front-end sensing units used for vehicle protection and warning technologies are mainly concentrated in the use of ultrasonic waves, radars or light reflection sensors. For instance, each side of a vehicle is equipped with an alarm apparatus, which consists of a voltage power supply, a light sensor, a signal amplifier, a voltage comparison amplifier and an alarm display. Based on the difference of reflected light intensity between the road surfaces with and without the line marking, an electric current would be generated. Then this current would be modulated to an appropriate voltage by the signal amplifier and outputted to the alarm display to warn the driver of the danger of departure from the lane.

Recently, with enhancement of image processing technology, CCD/CMOS cameras gradually become standard equipment on new-generation vehicles for various safety applications, such as parking assist, lane, vehicle and pedestrian detections. For example, a conventional lane departure warning apparatus and method includes a lane image capturing unit, a vehicle drift detection unit, and an alarm unit for lane departure prevention. The method for determining the drift of a vehicle from the lane includes the steps of image input, image analyzing and processing, region of interest (ROI) setting, lane drift detection, and alarm issuing to alert the driver to the danger of unintentional departure and then enhance the driving safety. Moreover, for the alarm issuing, the patent further includes an auto-judgment process to decide whether it is necessary to disable the alarm unit temporarily for avoiding overly interfering with the driver due to the frequent warnings.

However, due to the prior art is only based on the comparison of the lane line markings and the traveling track of a vehicle for assuring whether the vehicle drifts away from the normal path, the track estimation process is ignored. Thus the prior art will result in fault alarms or the error timing of alarm issuing. Therefore, there is an eager demand for a novel design that can provide the method and apparatus for improving the shortcomings in the prior arts.

SUMMARY OF THE INVENTION

The main objective of the present invention is to provide an improved method and apparatus for detecting lane departure, which can effectively improve the shortcomings in prior arts, such as the limited distance of usage, the insufficient response time, the inadequate comparison model, high error rate, and the false warning.

The secondary objective of the present invention is to provide a method and apparatus for detecting lane departure that a road is approximated by a parametric quadratic curve fitting model. Therefore a road geometry estimation model is established for predicting the trend of the road by the quadratic curve fitting equation.

To achieve the objective, the apparatus in accordance with the present invention includes an image capturing unit, a processing unit and a signal output unit. The method in accordance with the present invention includes an image recognition process and a deviation estimation process.

The detailed steps for the image recognition process are as follows. An image capturing step is for capturing image frame data of the road ahead of a vehicle by using the image capturing unit. A lane line recognition step divides the image frame data into an upper half portion and a lower half portion. The upper half portion is for determining daytime or nighttime and the lower portion is for lane line recognition. The lane line recognition step further includes a lane line feature recognition method.

The lane line feature recognition method includes a high grayscale recognition, a lane line edge feature recognition, and a lane width recognition. The high grayscale recognition is used to discriminate lane line from road surface by the character, which the lane lines have higher grayscale than the road surface. The lane line edge feature recognition is used to calculate a lane line width in the image frame data by the edge feature, which the lane line connects to the road surface. The lane width recognition is used to solve the standard lane width in the image frame data by the equation, which the practical standard lane width multiplied by the ratio of the lane line width in the image frame data to the practical standard lane line width equals to the standard lane width in the image frame data. The correct lane line is determined by conforming three recognition methods simultaneously.

The lane line recognition step includes the following steps.

A. establishing the road geometry estimation model: The position information of disappear point is substituted in a road geometry estimation equation with a predefined parameter to establish an initial road geometry estimation model. The road geometry estimation equation is a first quadratic curve fitting equation.

B. initial point search: The lower half portion of the image frame data is divided evenly into a plurality of sections from the lower end to the upper end. The initial point of the lane line in a predetermined region is detected in the plurality of sections from the lower end to the upper end based on at least one side of the estimated lane line of the initial road geometry estimation model and by using the lane line feature recognition method and the ROI to determine which section the initial point of practical lane line is located in;

C. road geometry estimation model correction: The line points in each section are recognized from the section which the initial point is located in to the next upward section by using the lane line feature recognition method. The information data of the line points is substituted in the road geometry estimation equation, and therefore the road geometry estimation model is corrected. The step of the road geometry estimation model correction is repeated in each section to establish the road geometry estimation model which approximates to the practical lane line track;

D. disappear point detection: Check whether the image intersection of the two side of the estimated lane lines calculated by the road geometry estimation model correction is located in the predetermined region to determine whether the road geometry estimation model approximates to the practical lane line track. If not, repeat the lane line recognition step to find the most approximate road geometry estimation model. Besides, it's a better way to improve the accuracy by checking whether the disappear point in each image frame data of some continuous image frame data be captured is close to or the same with each other. If the disappear point in each image frame data is close to each other, that means the road geometry estimation model approximates to the practical lane line track. Thus, the purpose of disappear point detection can be reached.

If the step C can not detect the lane line due to the numbers of line points are not enough, proceed to the step C'.

C'. compensation for line point of image: The practical standard lane width multiplied by the ratio of the lane line width in the image frame data to the practical standard lane line width equals to the standard lane width in the image frame data. The standard lane width in the image frame data is used for compensation. When the left initial point is detected and the right initial point is not detected, the right initial point is compensated. The left initial point plus the standard lane width in the image frame data yields the right initial point. Therefore, the compensative line point is used to correct the road geometry estimation model.

Furthermore the usage of low resolution image frame will increase the process speed efficiently. The lower half portion of the image frame data is divided into two segments. The resolution of the segment close to the vehicle is lower, but the resolution of the segment far from the vehicle is kept original resolution.

The deviation estimation process is used to determine whether the vehicle is deviating from the lane and further to issue a pre-alert. The deviation estimation process includes the following steps:

An operation processing step: Use the road geometry estimation model and the deviation estimation equation to calculate the transversal displacement, the traveling slope, and the lane curvature. The transversal displacement is calculated by the traveling path and the traveling slope;

A pre-alert step: Compare the transversal displacement and the corrected road geometry estimation model. If the vehicle is deviating or close to lane line, the warning is issued.

In the lane line recognition step in accordance with the present invention, the image frame data is divided into the upper half portion for determining the illumination so as to determine that it is at daytime or at nighttime and the detection mode can be switched to have higher recognition; the lower half portion is divided into two segments for detection by different resolution so as to increase the processing speed greatly and the accuracy in detection and recognition is still remained. The lane line recognition step uses a quadratic curve fitting equation to solve the lane line and disappear point and calculate the transversal displacement and the lane curvature, even the lane line is shielded by other vehicle, the conventional line fitting equation is used to recognize the lane line. In the present invention, the multi-lane is calculated by ROI and disappear point detection to avoid the fault determination and unsteadiness. In the present invention, because the lane width can be recognized and updated without calculating the angle between the vehicle/the image-capturing unit and the road surface in advance. The practical traveling path can be compared with the lane line immediately. If the practical traveling path is close to the lane line, while the driver does not respond any action by such as braking, turning light, etc. The signal output unit will issue the warning to alert the driver. On the contrary, when the driver responds, the present invention will detect and analyze the road status continuously. Moreover, by using the quadratic curve fitting equation, the lane curvature is solved. When the speed of the vehicle is too high and the curvature is too great, the signal output unit will issue the warning to alert the user to slow down or to control the speed or to brake.

Further benefits and advantages of the present invention will become apparent after a careful reading of the detailed description with appropriate reference to the accompanying drawings.

DETAILED DESCRIPTION OF THE INVENTION

Figure 1:
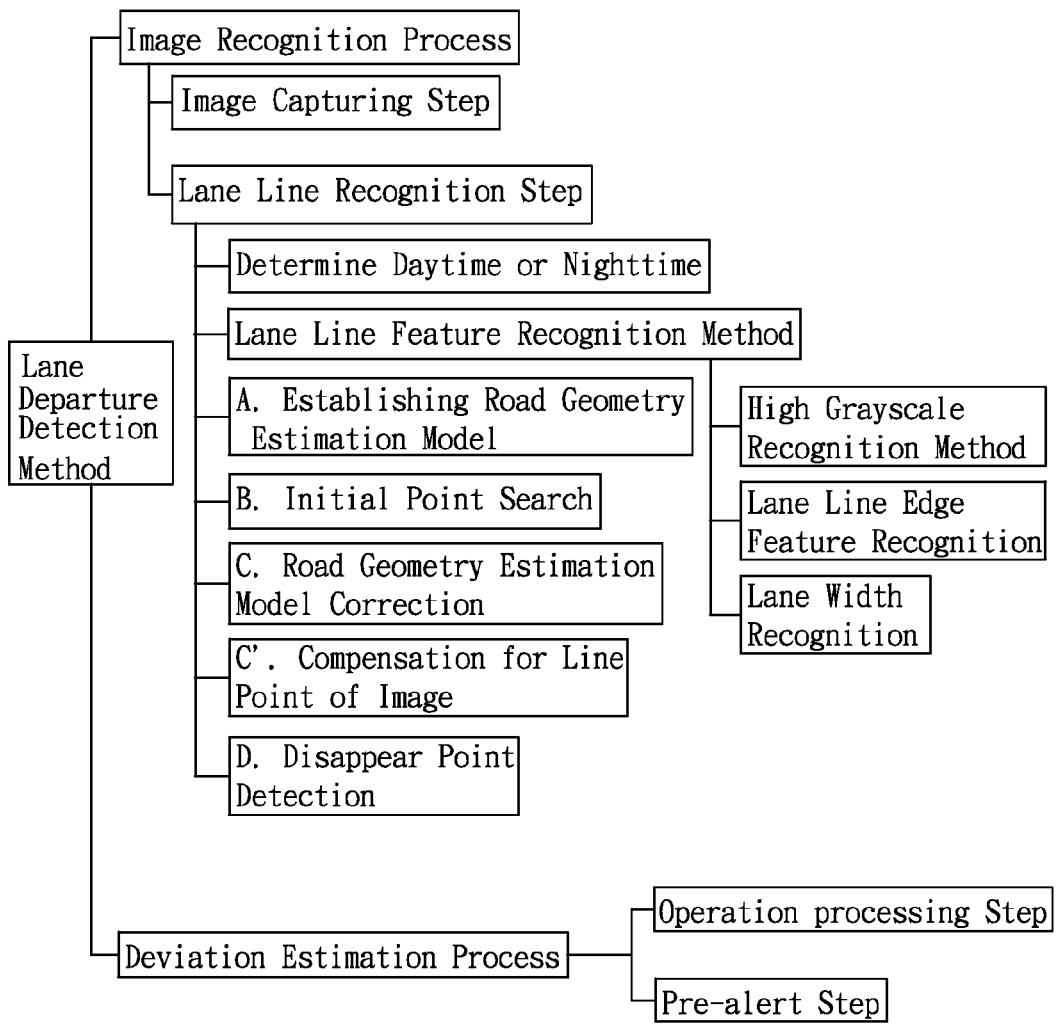
FIG. 1 is a block diagram of a method for detecting lane deviation in accordance with the present invention.

Referring to the drawings and initially to FIG. 1, a method for detecting lane departure in accordance with the present invention comprises an image recognition process and a deviation estimation process.

In the image recognition process, a quadratic curve fitting equation is used to establish a road geometry estimation model. If other vehicle shields the practical lane line, the line fitting equation can be used to solve the lane line. The line fitting equation is known in the prior art and thus the details will not be further described herein. The image recognition process has the following steps.

An image capturing step: capturing an image frame data of the road ahead of a vehicle by using an image capturing unit installed on the vehicle.

Figure 2:
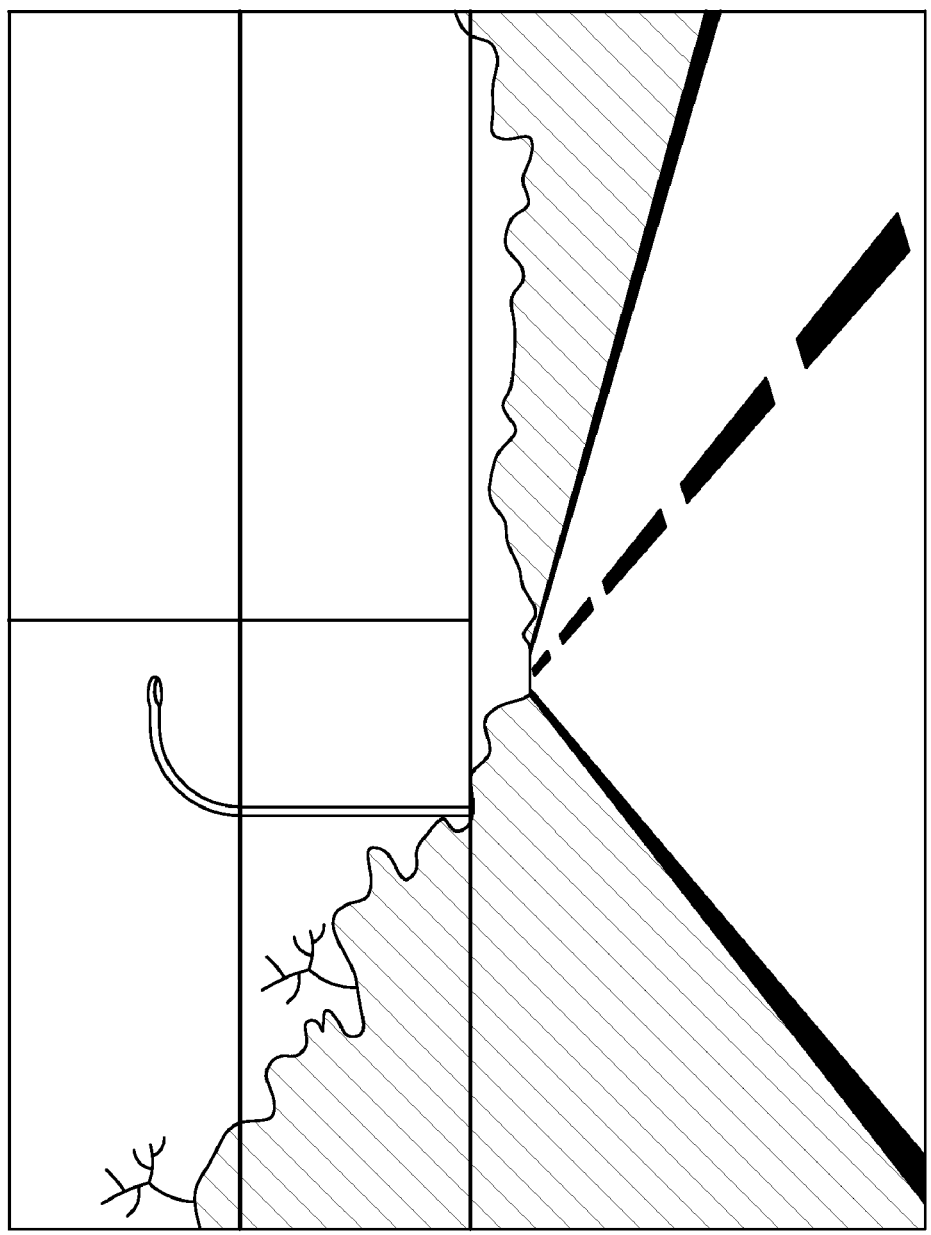
FIGS. 2 to 4 are schematic view showing the method for determining daytime or nighttime in accordance with the present invention.
Figure 3:
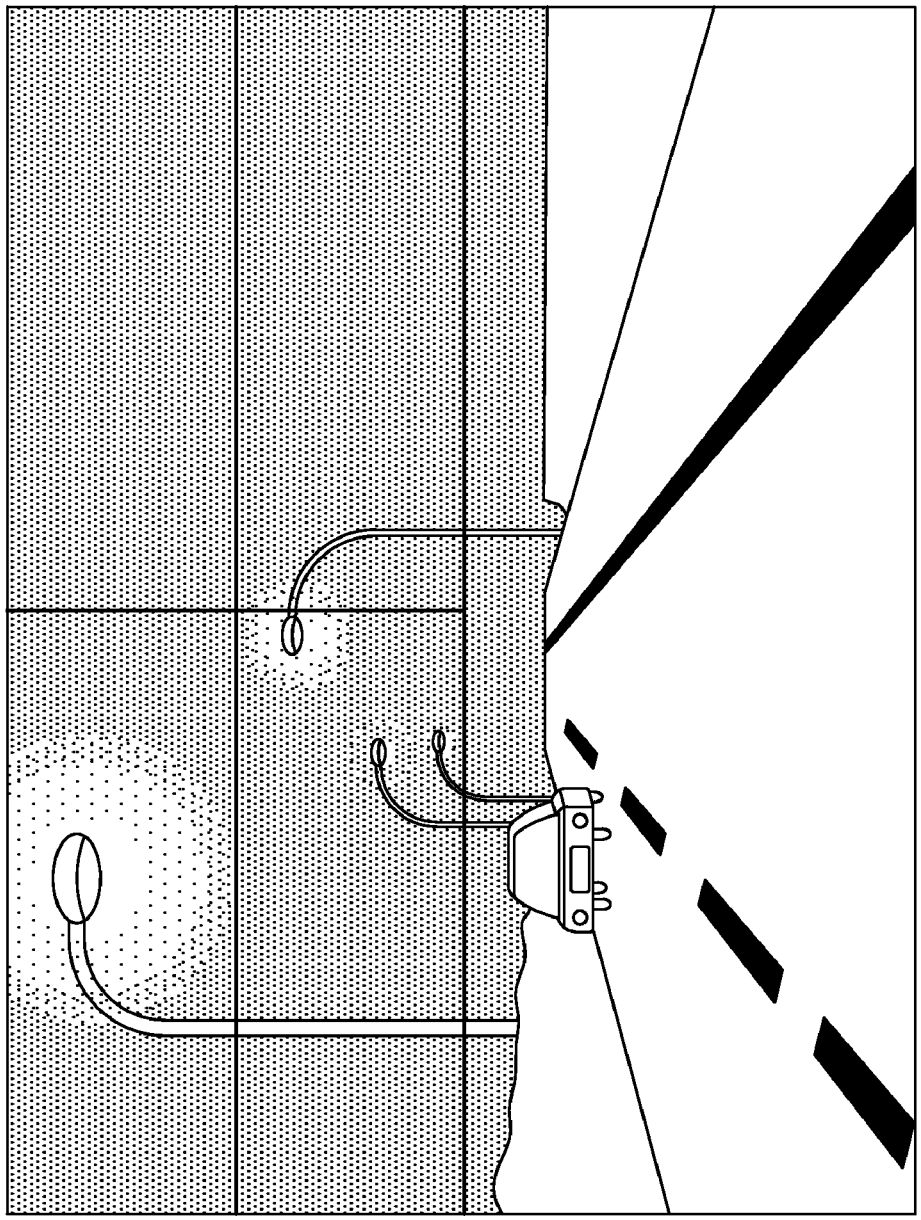
Figure 4:
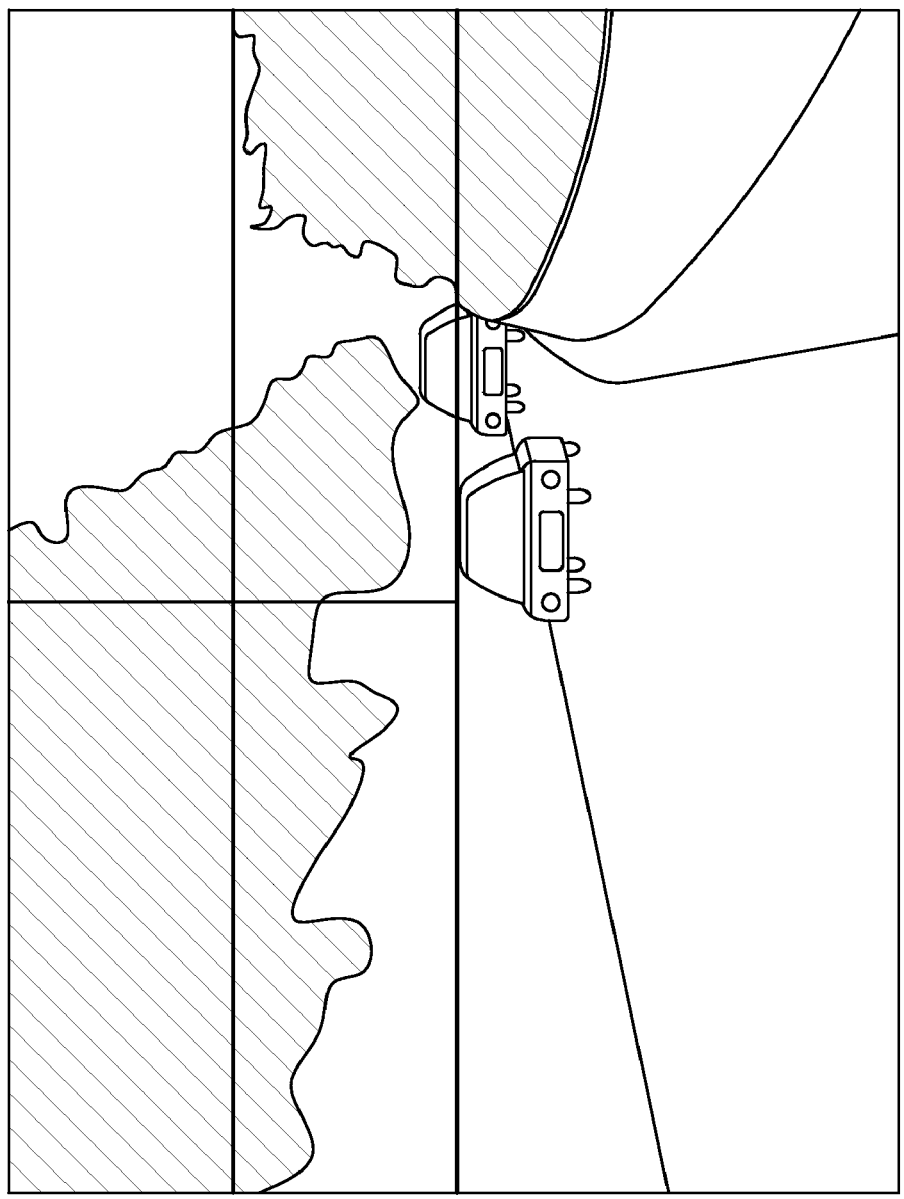

A lane line recognition step: dividing the image frame data into an upper half portion and a lower half portion. Referring to FIGS. 2 to 4, the upper half portion is divided into a plurality of sections for determining daytime or nighttime by the following equations so as to switch the lane line detection modes.

$$\frac{\sum_x \sum_y gray < th_{dark}}{\sum_x \sum_y 1} > Th_{night} \Rightarrow \text{Nighttime}$$

$$\frac{\sum_x \sum_y gray < th_{dark}}{\sum_x \sum_y 1} < Th_{day} \Rightarrow \text{Daytime}$$

Where gray is the grayscale for each image pixel; $th_{dark}$ is the threshold value of the lower grayscale; $Th_{night}$ is the threshold value for determining that the environment is at nighttime; and $Th_{day}$ is the threshold value for determining that the environment is at daytime.

When the summation of lower gray is greater than the $Th_{night}$, it is considered that the environment is at nighttime; on the contrary, it is determined that the environment is at daytime.

When the summation of lower gray is smaller than the $Th_{day}$, it is considered that the environment is at daytime; on the contrary, it is determined that the environment is at nighttime.

The lower half portion of the image frame data is divided into two segments. The resolution of the segment close to the vehicle is lower, but the resolution of the segment far from the vehicle is kept original resolution.

The lane line recognition step further includes a lane line feature recognition method to recognize the practical lane line. The lane line feature recognition method includes a high grayscale recognition, a lane line edge feature recognition, and a lane width recognition. The high grayscale recognition is used to discriminate lane line from road surface by the character, which the lane lines have higher grayscale than the road surface. The lane line edge feature recognition is used to calculate lane line width in the image frame data by the edge feature, which the lane line connects to the road surface. The lane width recognition is used to solve the standard lane width in the image frame data by the equation, which the practical standard lane width multiplied by the ratio of the lane line width in the image frame data to the practical standard lane line width equals to the standard lane width in the image frame data.

If the ratio of the lane line width in the image frame data to the practical standard lane line width is 0.5, which means the scale of the road in the image frame data and the practical road is 1:2. The lane line width in the image frame data is the practical standard lane line width multiplied by 0.5. After recognizing the lane line, the distance between two lane lines is compared with the standard lane line width in the image frame data. If the distance between two lane lines is equal to the standard lane line width in the image frame data, the recognized lane line is correct.

Thereby the correct lane line is determined by conforming three recognition methods simultaneously.

Figure 5:
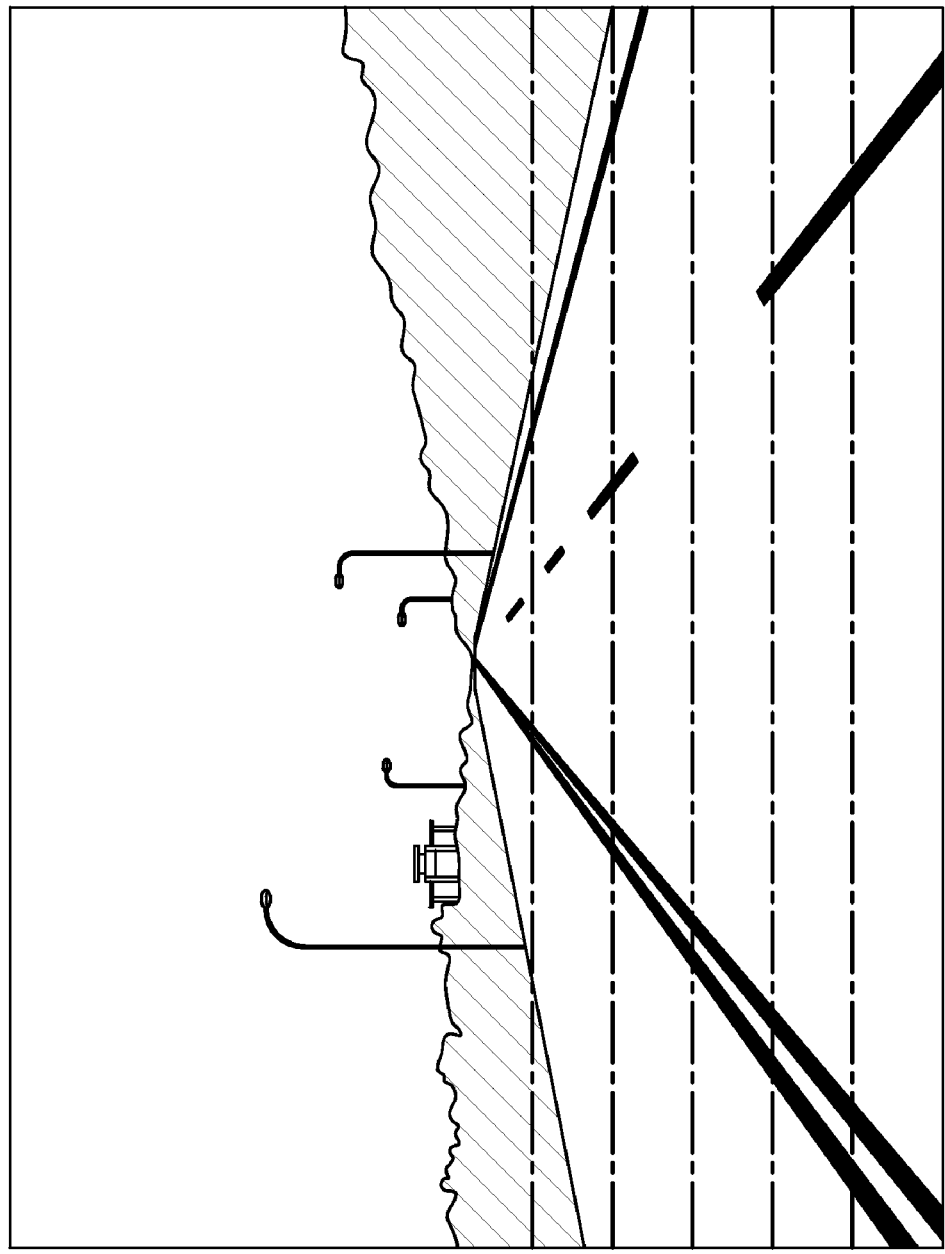
FIG. 5 is a schematic view showing the sections and rows in the division of the lane line in accordance with the present invention.
Figure 6:
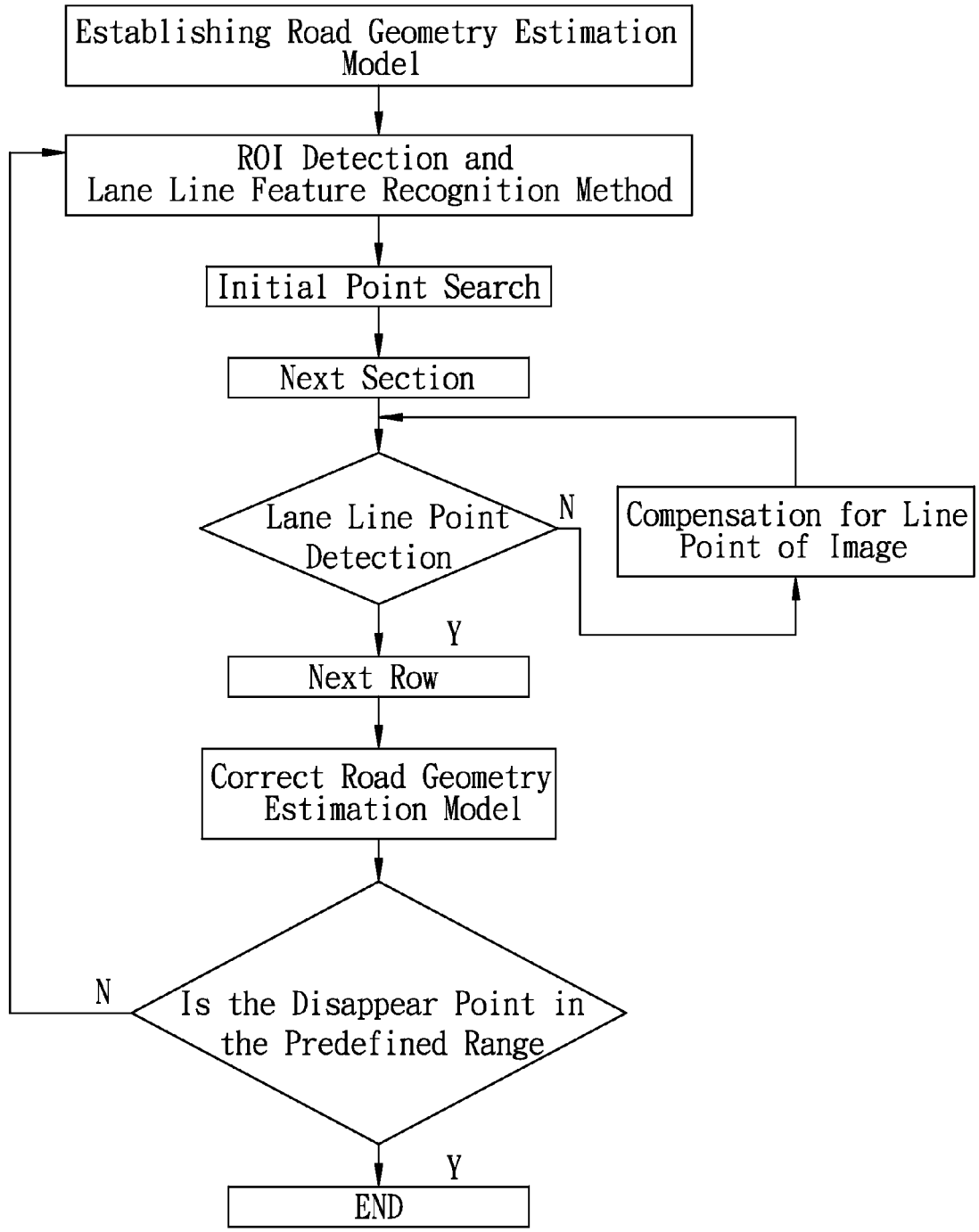
FIG. 6 is a flow chart of the lane line recognition step in accordance with the present invention.
Figure 7:
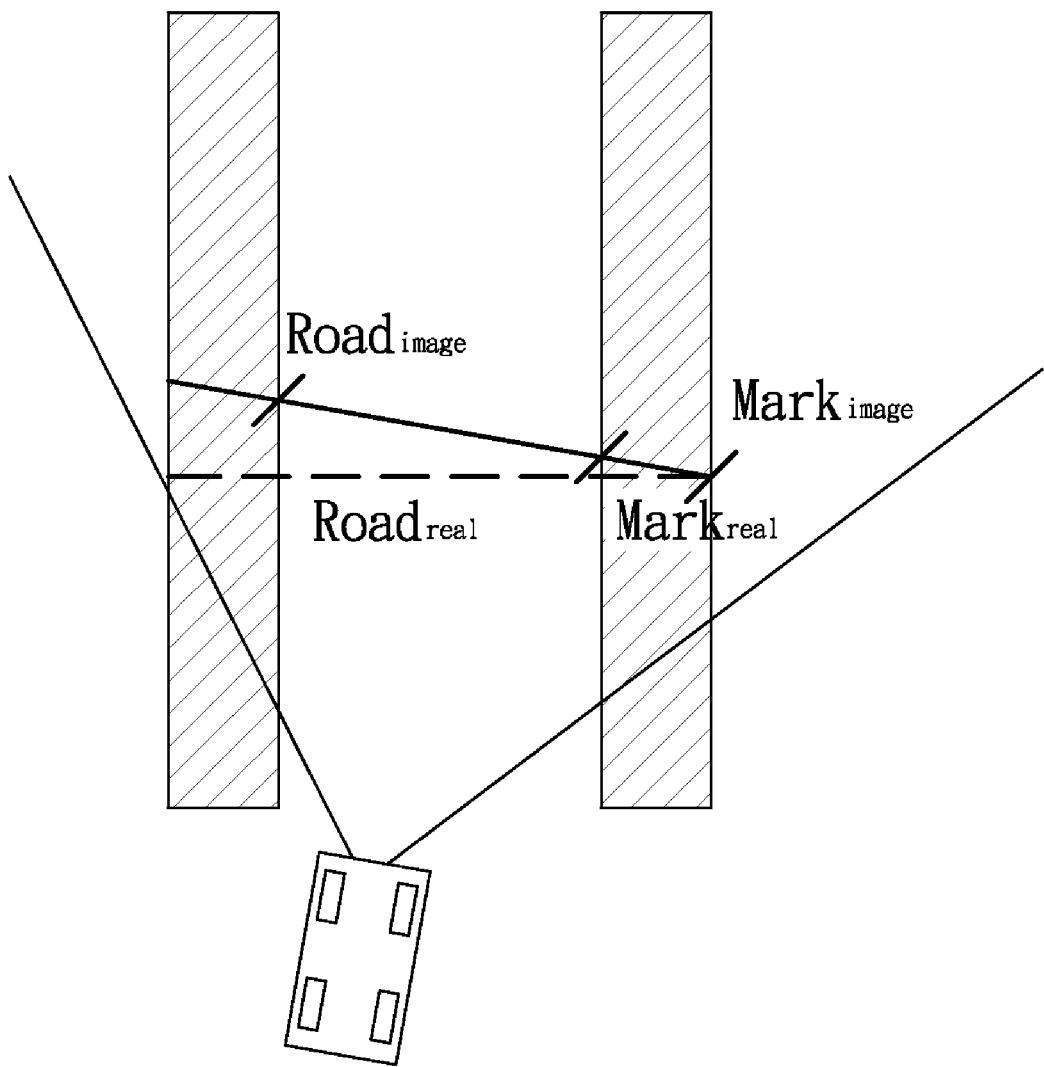
FIG. 7 is a schematic view showing the lane line width which is solved by coordinate transformation in accordance with the present invention.
Figure 11:
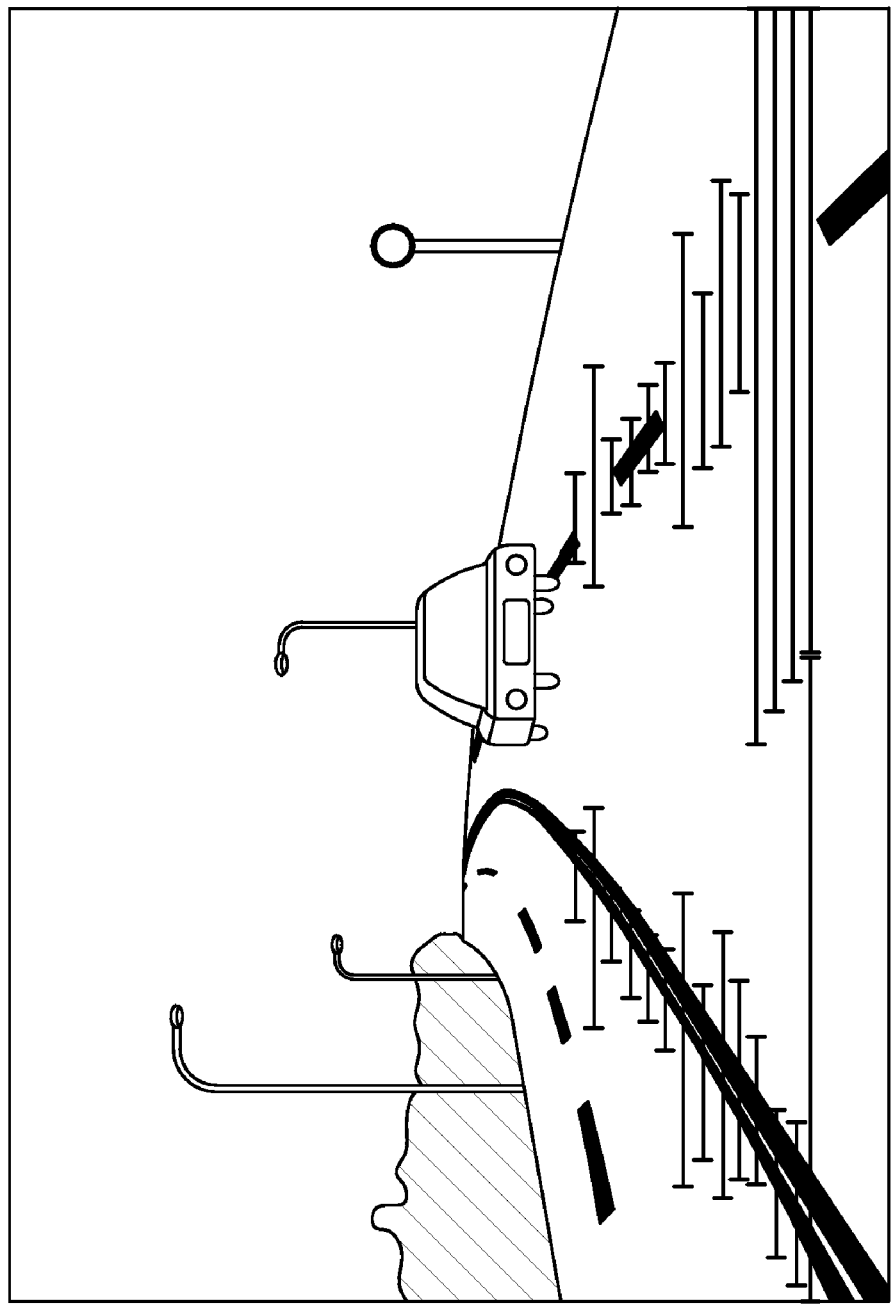
FIG. 11 is a schematic view showing the initial point search by using ROI in accordance with the present invention.

Referring to FIG. 5, in the lane line recognition step, the lower half portion of the image frame data is divided evenly into a plurality of sections from the lower end to the upper end. Determination of detection and correction is done from the lower end to the upper end, as shown in FIG. 11. The detection and determination of lane line is proceeding by the lane line feature recognition method with ROI as shown in FIG. 6. The lane line recognition step includes the following steps.

A. establishing the road geometry estimation model: Position information of a predefined disappear point is substituted in a road geometry estimation equation with a predefined parameter to establish a initial road geometry estimation model. The road geometry estimation equation is a first quadratic curve fitting equation. The disappear point is an intersection point which is formed by two lane lines of the image frame data intersecting in a distant place. The predefined disappear point is a center point of the image frame data as the initial road geometry estimation model is established. The road geometry estimation equation approximates the road by a parametric quadratic curve model. The quadratic curve fitting equation is $y = k1 \cdot x^2 + m1 \cdot x + b1$, where x and y are the longitudinal axis and transversal axis of a two dimensional space; k1, m1, b1 are the predefined parameters, where $$k1: -\frac{1}{650} \sim \frac{1}{650}(1/m),$$

m1:−tan(5.7)~tan(5.7), and b1: −2.5~2.5 (m). When the parameters, k1, m1, and b1, are determined, the trend of the road is determined. The initial road geometry estimation model is established by substituting the position information of the predefined disappear point and in the road geometry estimation equation with the parameters.

B. initial point search: The lower half portion of the image frame data is divided evenly into a plurality of sections from the lower end to the upper end. The initial point of the lane line in a predetermined region is detected in the plurality of sections from the lower end to the upper end based on at least one side of the estimated lane line of the initial road geometry estimation model and by using the lane line feature recognition method and the ROI to determine which section the initial point of practical lane line is located in. The initial point is detected from the lowest section and by one of the lane line matching the lane line feature recognition method. If the initial point is not detected, search in the next section till the initial point is detected. The predetermined region is adjusted by the detecting result of ROI. If the initial point is not detected in the predetermined region, enlarge the predetermined region. If the initial point is still not detected as the predetermined region is enlarged till a predefined degree, search in the next section.

C. road geometry estimation model correction: Referring to FIG. 6, the section which the initial point is located in is divided into a plurality of rows. The ROI detection is performed with the lane line feature recognition method row by row. If a fitted lane line point is recognized, the detection is performed to the next row until the detection is performed in all sections. The position information of all lane line points is substituted in the road geometry estimation equation to solve the parameters (k1, m1, b1). The road geometry estimation model in one section is corrected by the parameters of the plurality of lane line points in each row. The ROI detection is performed to the next section repeatedly. The road geometry estimation models in other sections are corrected continuously to make the corrected road geometry estimation model approximating to the practical lane line track. The position information of the lane line point is a positional coordinates. The ROI detection equation is listed as the following:

$$ROI_n = [u_{i-1} - \lambda_n \cdot Mark_l, u_{i-1} + \lambda_n \cdot Mark_l]$$

$$ROI_d = [u_{i-1} - \lambda_d \cdot Mark_l, u_{i-1} + \lambda_d \cdot Mark_l]$$

where $u_{i-1}$ is a transversal coordinate of the lane line of a former row; $\lambda_n$ is a parameter showing that no lane line is detected in the former row; $\lambda_d$ is a parameter showing that a lane line is detected in the former row; and Mark$_i$ is a width of a lane line on an image plane of the row processed now.

C'. compensation for line point of image: In the step C the lane line point which fits the lane line feature recognition method is not detected by the ROI detection because the lane line is a dash line or is not clear. So the parameters can't be solved and the road geometry estimation model can't be corrected. In the meantime, a compensation for line point of image is used. The practical standard lane width multiplied by the ratio of the lane line width in the image frame data to the practical standard lane line width equals to the standard lane width in the image frame data. The standard lane width in the image frame data is used for compensation. When the left lane line point is detected and the right lane line point is not detected, the right lane line point is compensated. The left lane line point plus the standard lane width in the image frame data yields the right lane line point. Therefore, the compensative lane line point is used to correct the road geometry estimation model. The compensation equation is listed as the following:

$$\frac{Mark_{image}}{Mark_{real}} = \frac{Road_{image}}{Road_{real}} \Rightarrow Road_{image} = Road_{real} \frac{Mark_{image}}{Mark_{real}}$$

where $Road_{real}$ is the standard lane width which has a standard value of 370 centimeter; $Mark_{real}$ is the practical lane line width which has a standard value of 15 centimeter; $Road_{image}$ is the lane width in the image frame data; and $Mark_{image}$ is standard the lane line width in the image frame data.

If the compensated lane line points are enough for correcting the road geometry estimation model, then proceed to the step D. If the original lane line points are enough, the compensation isn't needed and the step C' is skipped.

D. disappear point detection: Check whether the image intersection of the two side of the estimated lane lines calculated by the road geometry estimation model correction is located in a predetermined region to determine whether the road geometry estimation model approximates to the practical lane line track. If not, repeat the lane line recognition step to find the most approximate road geometry estimation model. For improving the accuracy, it's essential to capture some continuous image frame data. Check whether the disappear points in each image frame data of some continuous image frame data are close to each other or the same to reach the purpose of disappear point detection. If the disappear points in each image frame data are close or in a predetermined range, that means the road geometry estimation model approximates to the practical lane line track. If the disappear points aren't in the predetermined range or the distance of the disappear points of each image frame data is more than the predetermined range, repeat the step A to D to correct the road geometry estimation model.

Figure 8:
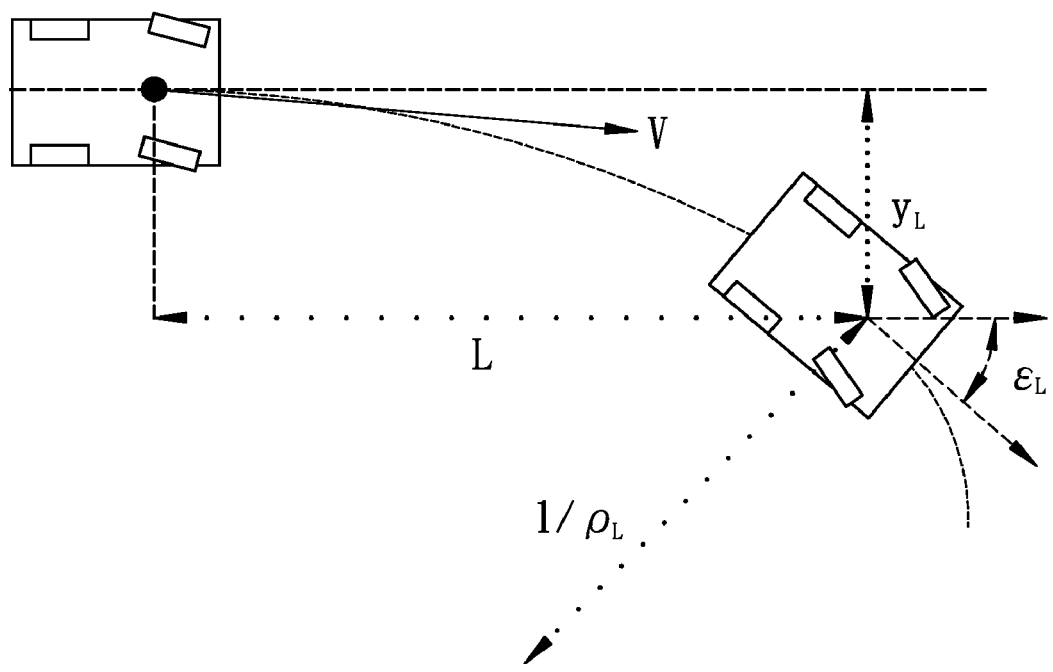
FIG. 8 is a schematic view showing the real vehicle state by using the deviation estimation process in accordance with the present invention.

Referring to FIG. 8, after the road geometry estimation model is complete, the corrected road geometry estimation model is inputted into a deviation estimation process. A deviation estimation equation is a second quadratic curve fitting equation which the parameters of the corrected road geometry estimation model is inputted into. The deviation estimation equation is used to calculate the lane departure status.

Figure 9:
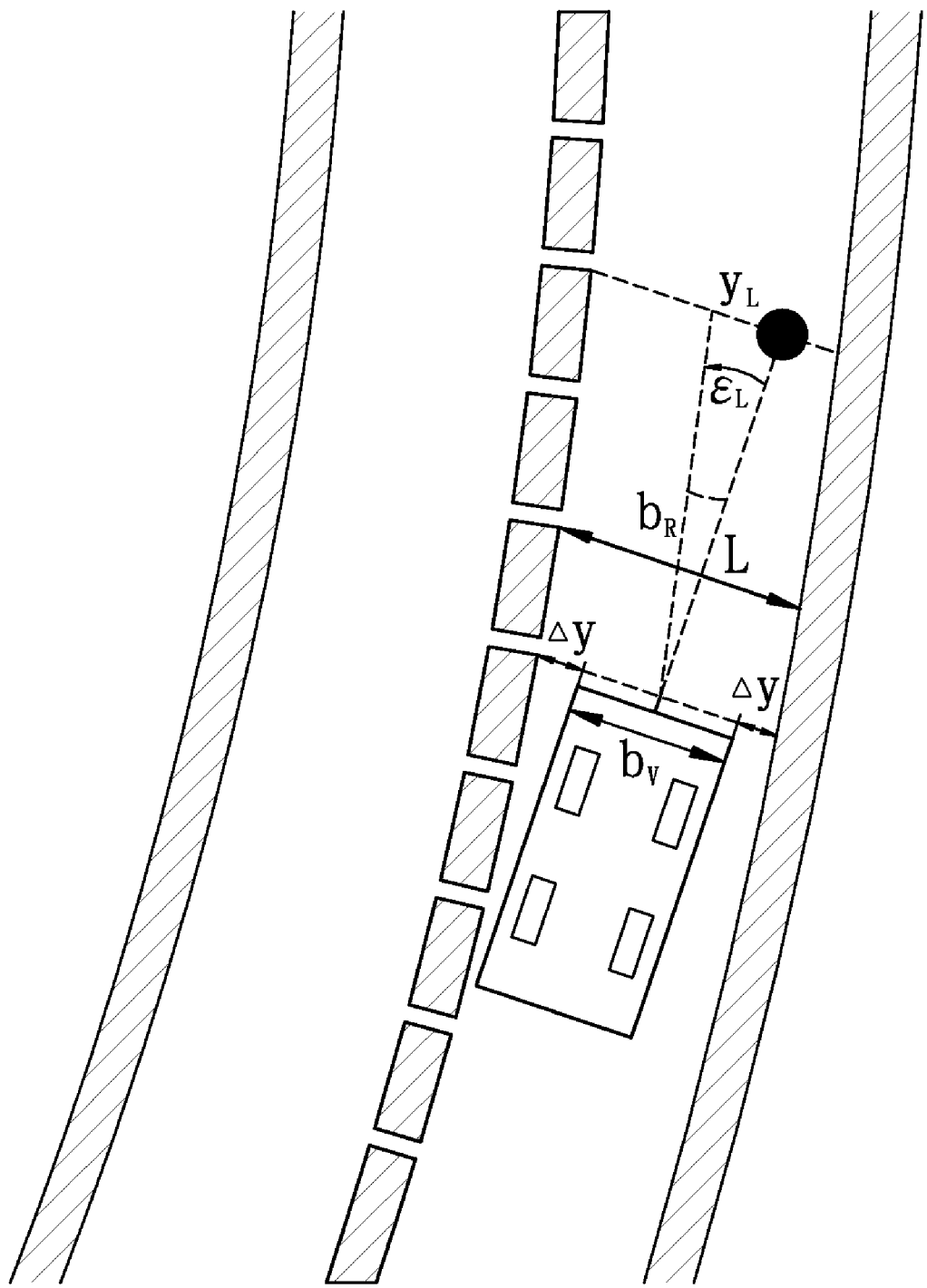
FIG. 9 is a schematic view showing the distance from the vehicle to the edges of the lane line in accordance with the present invention.

Referring to FIG. 9, the deviation estimation equation is used to determine the departure status between the traveling path and the center of the lane for checking whether the vehicle deviates form the lane line or not, where L is the traveling path or the preview distance; $y_L$ is the displacement of the vehicle from the center point of the lane (the reference point). A transversal displacement between the vehicle and the lane line is calculated by the preview distance, the displacement of the vehicle from the reference point, and the traveling slop to determine the departure of the vehicle. The deviation estimation process includes the following steps.

An operation processing step: Use the corrected road geometry estimation model and the deviation estimation equation to calculate the transversal displacement, the traveling slope, and the lane curvature.

The deviation estimation equation is $y=k2 \cdot x^2 + m2 \cdot x + b2$, where x and y are longitudinal axis and transversal axis of a real plane; and k2, m2, and b2 are parameters which are solved by the corrected road geometry estimation model.

The traveling slope can be calculated by the road geometry estimation model and the equation of the traveling slope is $\epsilon_L = 2 \cdot k2 \cdot x + 2$;

Referring to FIG. 9, the transversal displacement $\Delta$ of the vehicle is calculated by the traveling slope and the equation of the transversal displacement is $\Delta = y_L - L \times \epsilon_L$; where $\Delta$ is the transversal displacement of the vehicle; $y_L$ is the displacement of the vehicle from the reference point; L is the preview distance; and $\epsilon_L$ is the traveling slope.

Further, the lane curvature can be derived from the lane line track which is estimated by the corrected road geometry estimation model, and the equation of the lane curvature is $$\rho_L = \frac{2 \cdot k2}{(1 + (2 \cdot k2 \cdot x + m2)^2)^{3/2}};$$

Figure 10:
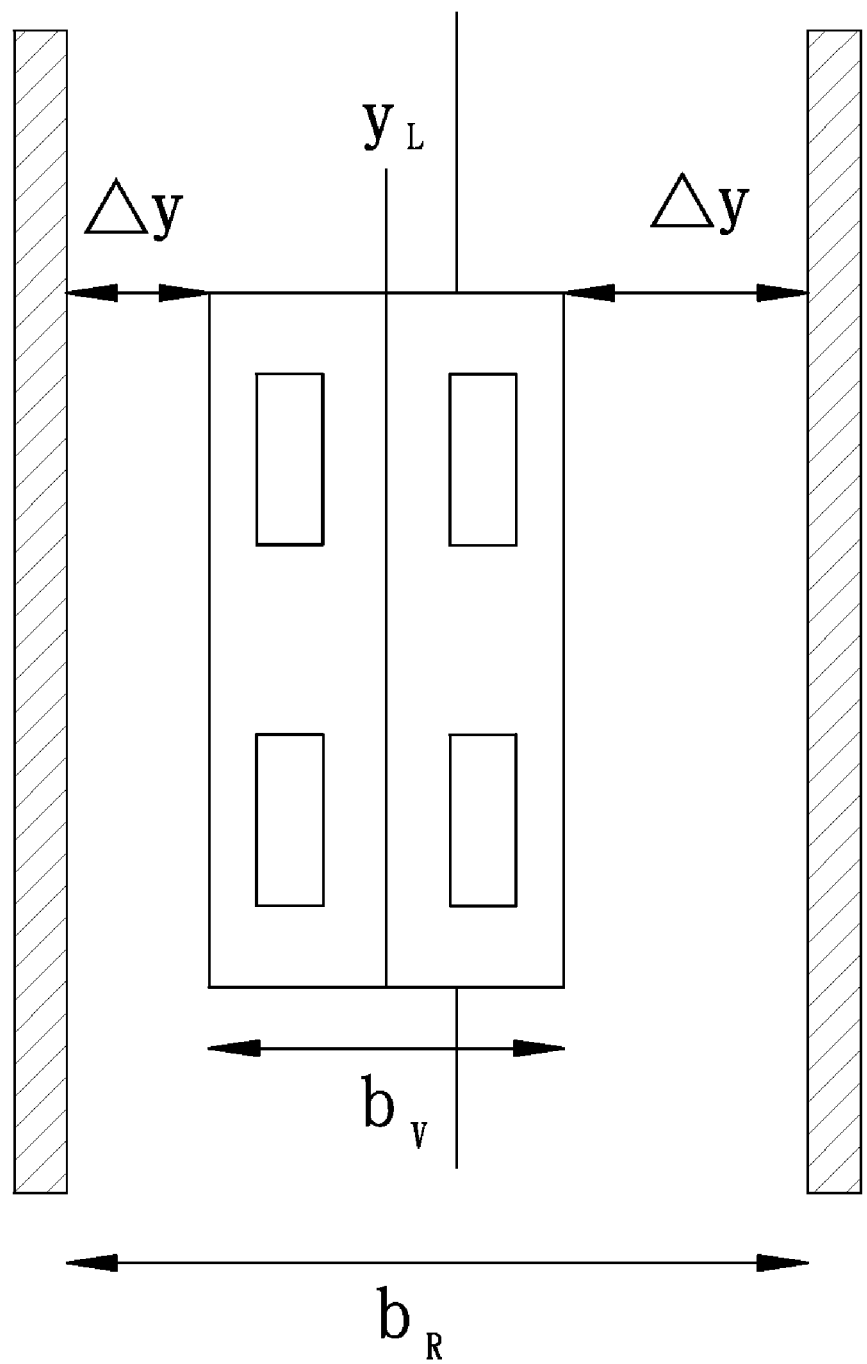
FIG. 10 is a schematic view showing the transversal displacement as the vehicle is in parallel to the lane line in accordance with the present invention.

Therefore, referring to FIG. 10, the distance from the vehicle to the lane line edge can be calculated;

$$\Delta y = \begin{cases} \frac{b_R}{2} - \left(\frac{b_V}{2} + y_L - L \times \epsilon_L\right) \\ \frac{b_R}{2} - \left(\frac{b_V}{2} - y_L + L \times \epsilon_L\right) \end{cases}$$

Where $b_R$ is the lane width which is from the coordinate transformation from the lane width of one row in the image plane, which the lane width in the image plane is solved by the road geometry estimation model; $b_V$ is the width of the vehicle; $y_L$ is the displacement of the vehicle from the reference point; L is the preview distance; and $\epsilon_L$ is the traveling slope.

If the vehicle is driven in a straight lane; the equation can be simplified as the following:

$$\Delta y = \begin{cases} \frac{b_R}{2} - \left(\frac{b_V}{2} + y_L\right) \\ \frac{b_R}{2} - \left(\frac{b_V}{2} - y_L\right) \end{cases}$$

Where $b_R$ is the lane width; $b_V$ is the width of the vehicle; and $y_L$ is the displacement of the vehicle from the reference point.

The transversal displacement, the traveling slope, and the lane curvature which are calculated by the deviation estimation equation can be used in a pre-alert step.

The pre-alert step: Compare the transversal displacement and the corrected road geometry estimation model to determinate the distance between the vehicle and the lane line. According to ISO (international standard organization) 2007 rule 17361, the final alert line for a passenger vehicle is defined as a line out of the lane line with a distance of 0.3 meter; and the final alert line for a truck or a bus is defined as a line out of the lane line with a distance of one meter. A pre-alert line is set within the lane. Referring to FIGS. 8 and 9, if the traveling path of the vehicle is deviating or close to the pre-alert line or the lane line, the warning is issued automatically.

Besides, if the ratio of the speed to the lane curvature or the radius of the lane curvature is abnormal, especially when the speed is too high, the vehicle can not drive in a curve lane successfully. Then warning is issued to alert the driver to slow down. The speed limit, the lane curvature, and the radius of the lane curvature in the optimum state are listed in the Table 1. The practical values refer the real status. When the speed of the vehicle is over the maximum speed limited by the lane curvature, warning will be issued.

TABLE 1

List of the relation between speed limit and lane curvature

| lane Curvature ($\rho L$) | Radius of the lane curvature ($1/\rho L$) (m) | Speed limit (Km/hr) |
|---|---|---|
| 0 | Infinite | 120 |
| 0.001 | 1000 | 110 |
| 0.004 | 250 | 80 |
| 0.006 | 150 | 60 |
| 0.01 | 100 | 40 |

By above mentioned steps, the road geometry estimation model is calculated by the images from the image capturing unit to determine whether the traveling path is within the lane lines at two sides. When the traveling path is deviated from the lane lines, or the speed is too high to have an over large curvature in the curved lane, warning will be issued to have the effect of pre-alert.

The object of the present invention further includes the apparatus for detecting a lane departure of a vehicle, using above mentioned method. The apparatus includes an image capturing unit, a processing unit and a signal output unit.

When a vehicle is actuated and the speed is over a pre-defined value, the lane departure detection apparatus in accordance with the present invention will actuate. The image capturing unit is a CCD camera unit or a CMOS camera unit installed within a vehicle for capturing the image frame data ahead of the vehicle and transferring the captured image frame data to the processing unit.

A road environment image frame data captured by the image capturing unit, the speed, and the signal of turn lights and brake are transferred to the processing unit. The processing unit uses the quadratic curve fitting equation to correct the road geometry estimation model to approximate the practical lane line track. And the processing unit uses the deviation estimation process to determine whether the vehicle is deviating from the lane line and warning will be issued. If the traveling path is deviated from the lane line, or the speed is too high and the curvature of the road is too great to achieve a predefined alert range while the turn lights or the brake apparatus do not emit signals to the processing unit, the processing unit will emit signals to the signal output unit. On the contrary, if it has achieved to the predefined alert range while the turn lights and brake apparatus are actuated and emit signal to the processing unit, the image capturing unit will re-capture the image frame data for re-judging.

The signal output unit provides light source, images or audio signals. When the signals from the processing unit are transferred to the signal output unit, the signal output unit will alert the driver by light, visual variation, or sound.

By above mentioned apparatus when the driving of the vehicle occurs some abnormal conditions so that the vehicle is not within the lane line, or the speed is too high and the curvature of the curved lane is too great, the lane departure detection apparatus in accordance with the present invention can alert the driver to keep attention so as to have the effect of pre-alert.

Although the invention has been explained in relation to its preferred embodiment, it is to be understood that many other possible modifications and variations can be made without departing from the spirit and scope of the invention as hereinafter claimed.

What is claimed is:

1. A method for detecting lane departure of a vehicle, comprising:
    an image recognition process which includes the following steps:
        an image capturing step for capturing an image frame data of a road ahead of the vehicle by using an image capturing unit;
        a lane line recognition step for analyzing the image frame data and establishing a road geometry estimation model by using a quadratic curve fitting equation, a plurality of parameters solved by substituting a plurality of position data calculated by recognizing a plurality of lane lines in the image frame data to correct the road geometry estimation model and make the corrected road geometry estimation model approximating a practical lane line track; and
    a deviation estimation process which includes the following steps:
        an operation processing step: use the corrected road geometry estimation model and the quadratic curve fitting equation to calculate a transversal displacement, a traveling slope, and a lane curvature; and
        a pre-alert step: compare the transversal displacement and the corrected road geometry estimation model to determinate a distance between the vehicle and the lane line; if the vehicle is close to the lane line, a warning is issued;
    wherein the transversal displacement is calculated by the equation:

$$\Delta = y_L - L \times \epsilon_L$$

where $\Delta$ is the transversal displacement of the vehicle; $y_L$ is a displacement of the vehicle from a reference point; L is a preview distance; and $\epsilon_L$ is the traveling slope; the distance between the vehicle and the lane line is calculated by the equation:

$$\Delta y = \begin{cases} \frac{b_R}{2} - \left(\frac{b_V}{2} + y_L - L \times \epsilon_L\right) \\ \frac{b_R}{2} - \left(\frac{b_V}{2} - y_L + L \times \epsilon_L\right) \end{cases}$$

where $b_R$ is a lane width which is from the coordinate transformation from the lane width of one row in the image plane, which the lane width in the image plane is solved by the road geometry estimation model; $b_v$ is a width of the vehicle; $y_L$ is the displacement of the vehicle from the reference point; L is the preview distance; and $\epsilon_L$ is the traveling slope.

2. The method for detecting lane departure of the vehicle as claimed in claim 1, wherein the lane line recognition step further includes a lane line feature recognition method which includes the following methods:
- a high grayscale recognition for discriminating the lane line from road surface by a character that the lane lines have higher grayscale than the road surface;
- a lane line edge feature recognition for calculating a lane line width in the image frame data by the edge feature that the lane line connects to the road surface; and
- a lane width recognition for solving a standard lane width in the image frame data by an equation in which a practical standard lane width multiplied by a ratio of a lane line width in the image frame data to a practical standard lane line width equals to the standard lane width in the image frame data.

3. The method for detecting lane departure of the vehicle as claimed in claim 2, wherein the lane line recognition step includes the following steps:

A) establishing the road geometry estimation model: a position information of a predefined disappear point is substituted in the quadratic curve fitting equation to establish an initial road geometry estimation model, whereby the disappear point is an intersection point which is formed by two lane lines of the image frame data intersecting in a distant place, the predefined disappear point is a center point of the image frame data as the initial road geometry estimation model is established;

B) initial point search: the image frame data is divided into a plurality of sections, an initial point of the lane line in a predetermined section is detected based on at least one side of the estimated lane line of the initial road geometry estimation model and by using the lane line feature recognition method to determine which section the initial point of practical lane line is located in;

C) road geometry estimation model correction: in the section which the initial point is located in, the lane line feature recognition method is continuously used to recognize the lane lines in each section, the position information of the lane lines is substituted in the quadratic curve fitting equation to correct the road geometry estimation model; and D) disappear point detection: check whether the image intersection of the two side of the estimated lane lines calculated by the corrected road geometry estimation model is located in a predetermined section to determine whether the road geometry estimation model approximates to the practical lane line track; if not, repeat the lane line recognition step to find the most approximate road geometry estimation model.

4. The method for detecting lane departure of the vehicle as claimed in claim 3, wherein the lane line recognition step further includes the following step:

C') compensation for line point of image: if in the step C) a lane line point is not detected, the standard lane width in the image frame data is used to compensate the lane line point by solving the equation that the practical standard lane width multiplied by the ratio of the lane line width in the image frame data to the practical standard lane line width equals to the standard lane width in the image frame data; the compensation equation is listed as the following:

$$\frac{Mark_{image}}{Mark_{real}} = \frac{Road_{image}}{Road_{real}} \Rightarrow Road_{image} = Road_{real} \frac{Mark_{image}}{Mark_{real}}$$

where $Road_{real}$ is the standard lane width which has a standard value of 370 centimeter; $Mark_{real}$ is the practical lane line width which has a standard value of 15 centimeter; $Road_{image}$ is the lane width in the image frame data; and $Mark_{image}$ is standard the lane line width in the image frame data.

5. The method for detecting lane departure of the vehicle as claimed in claim 3, wherein a single section in step C is divided into a plurality of rows; the ROI (region of interest) detection is performed; the ROI detection function is listed as the following:

$$ROI_n = [u_{i-1} - \lambda_n \cdot Mark_I, u_{i-1} + \lambda_n \cdot Mark_I]$$

$$ROI_d = [u_{i-1} - \lambda_d \cdot Mark_I, u_{i-1} + \lambda_d \cdot Mark_I]$$

where $u_{i-1}$ is a transversal coordinate of the lane line of a former row; $\lambda_n$ is a parameter showing that no lane line is detected in the former row; $\lambda_d$ is a parameter showing that a lane line is detected in the former row; and $Mark_I$ is a width of a lane line on an image plane of the row processed now.

6. The method for detecting lane departure of the vehicle as claimed in claim 1, wherein the quadratic curve fitting equation is $y = k1 \cdot x^2 + m1 \cdot x + b1$, where x and y are the longitudinal axis and transversal axis of a two dimensional space; k1, m1, b1 are predefined parameters, and $$k1: -\frac{1}{650} \sim \frac{1}{650} (1/m),$$

m1: $-\tan(5.7) \sim \tan(5.7)$, and b1: $-2.5 \sim 2.5$ (m).

7. The method for detecting lane departure of the vehicle as claimed in claim 1, wherein the lane line recognition step further includes the following equation to determine daytime or nighttime so as to switch the lane line detection modes:

$$\frac{\sum_x \sum_y [gray < th_{dark}]}{\sum_x \sum_y 1} > Th_{night} \Rightarrow \text{Nighttime}$$

$$\frac{\sum_x \sum_y [gray < th_{dark}]}{\sum_x \sum_y 1} < Th_{day} \Rightarrow \text{Daytime}$$

where gray is the grayscale for each image pixel; $th_{dark}$ is the threshold value of the lower grayscale; $Th_{night}$ is the threshold value for determining that the environment is at nighttime; and $Th_{day}$ is the threshold value for determining that the environment is at daytime; when the summation of lower gray is greater than the $Th_{night}$, it is considered that the environment is at nighttime; on the contrary, it is determined that the environment is at daytime; when the summation of lower gray is smaller than the $Th_{day}$, it is considered that the environment is at daytime; on the contrary, it is determined that the environment is at nighttime.

8. The method for detecting lane departure of the vehicle as claimed in claim 1, wherein the quadratic curve fitting equation is $y=k2 \cdot x^2+m2 \cdot x+b2$, where x and Y are longitudinal axis and transversal axis of a real plane; and k2, m2, and b2 are parameters which are solved by the corrected road geometry estimation model.

9. The method for detecting lane departure of the vehicle as claimed in claim 8, wherein the traveling slope is calculated by the corrected road geometry estimation model, the equation of the traveling slope is $\epsilon_L = 2 \cdot k2 \cdot x + m2$.

10. The method for detecting lane departure of the vehicle as claimed in claim 8, wherein the lane curvature is derived from a lane line track estimated by the corrected road geometry estimation model, the equation of the lane curvature is $$\rho_L = \frac{2 \cdot k2}{(1+(2 \cdot k2 \cdot x + m2)^2)^{3/2}}.$$

* * * * *